3,697,308
BORON REINFORCED POLYIMIDE COMPOSITES
Hyman R. Lubowitz, Hawthorne, and Robert W. Vaughan, Manhattan Beach, Calif., assignors to TRW Inc., Redondo Beach, Calif.
No Drawing. Continuation-in-part of application Ser. No. 875,523, Nov. 10, 1969. This application May 25, 1970, Ser. No. 40,405
The portion of the term of the patent subsequent to Feb. 23, 1988, has been disclaimed
Int. Cl. B32b 15/08
U.S. Cl. 117—65.2    20 Claims

ABSTRACT OF THE DISCLOSURE

This invention is directed to a process for preparing reinforced resin laminates and the products obtained therefrom characterized as having improved thermal stability and low-void content. More specifically this invention is directed to a process of preparing reinforced polyimide laminates or plastic composites which comprises impregnating a substantially fibrous material, i.e., boron filaments with an effective amount of an organic solution of a polyamide-acid precursor. The boron filaments impregnated with the precursor, i.e., the polyamide-acid, may be heated to temperatures ranging up to about 125° C. to remove a substantial part of the solvent and thereby obtain an intermediate which may be characterized as having tack and drape. Subsequently, the polyamide-acid may be imidized, in situ, to the imide prepolymer and then cured or alternatively cured directly by the application of heat with temperatures ranging from about 125° C. to 350° C. and at pressures ranging up to about 1200 p.s.i. Under these conditions, the polyamide-acid will be cured, in situ, to form a reinforced thermosetting resin laminate or composite. The precursor of the polyimide prepolymer, i.e., the polyamide-acid, may be prepared by coreacting approximately stoichiometric amounts of at least one polyfunctional amine with a mixture of anhydrides consisting essentially of at least one polyfunctional anhydride and a monoanhydride having the formula:

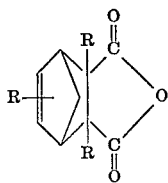

wherein R is selected from the group consisting of hydrogen and lower alkyl radicals having 1 to 5 carbon atoms per molecule and combinations thereof.

---

This application is a continuation-in-part of application Ser. No. 875,523, filed on Nov. 10, 1969.

This invention relates to reinforced resin laminates or plastic composites of improved thermal stability and low-void content and to the process of preparing same which comprises impregnating boron filaments with an effective amount of an organic solution containing a polyamide-acid. A substantial part or all of the organic solvent, e.g., amounts ranging from 0 to 100% may be removed from the impregnated filaments by subjecting said filaments and polyamide-acid to temperatures ranging up to about 125° C. or higher to obtain an intermediate which may be characterized as having tack and drape. Subsequently, the polyamide-acid may be imidized, in situ, at temperatures ranging from about 125° C. to 200° C. to form comparatively low molecular weight imide prepolymers. These polyimide prepolymers may be cured completely at pressures ranging up to about 1200 p.s.i. and at temperatures ranging from about 200° to 350° C. to form thermosetting resin-reinforced composites.

The polyamide-acids which are referred to herein as the precursors of the polyimide prepolymers are prepared by coreacting approximately stoichiometric amounts of at least one polyfunctional amine, e.g., an aromatic diamine, with a mixture of anhydrides consisting essentially of at least one polyfunctional anhydride, e.g., an aromatic dianhydride and a monoanhydride characterized by the formula:

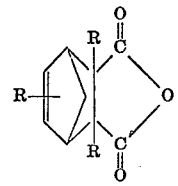

wherein R is selected from the group consisting of hydrogen and lower alkyl radicals having 1 to 5 carbon atoms per molecule and combinations thereof.

More particularly, this invention relates to a polyimide-resin-reinforced composite, e.g., boron laminates, prepared by impregnating boron filaments with a precursor of a polyimide prepolymer, i.e., a polyamide-acid which is capable of being pyrolytically polymerized, in situ, to a high-molecular weight thermosetting polyimide having an average molecular weight of at least 10,000. These polyimide resins are formed, dispersed throughout the reinforcing boron filaments, by applying an organic solution of the polyamide-acid to the filaments followed by heating said impregnated filaments at temperatures ranging from about 0° to 125° C. whereby a substantial part of the solvent may be removed to obtain an intermediate having good tack and drape. Subsequently, instead of directly curing the intermediate at temperatures ranging up to about 350° C., the intermediates may be heated to temperatures ranging up to about 200° C. where said polyamide-acid is imidized to relatively low molecular weight polyimide prepolymers having average molecular weights ranging from about 500 to 6,000 and preferably about 500 to 3,000. These imide prepolymer-impregnated boron filaments are highly stable at ambient temperatures and therefore have a long shelf life. With the additional application of heat, i.e., temperatures ranging up to about 350° C., or higher, the polyimide prepolymers are cured, in situ, to form reinforced polyimide resin composites of improved thermal stability and low-void content, i.e., less than 2%.

Presently, polyimide reinforced laminates are known primarily because of their outstanding physical and chemical properties and particularly because of their stability at elevated temperatures. Thus, because of these and other known attractive characteristics, polyimide reinforced composites have found numerous applications in areas where high-strength and heat-resistant materials are required. However, while the available polyimide composites are desirable, they are, nevertheless, economically at a disadvantage because of the difficulties encountered in processing the laminates.

The polyimides prepared heretofore, for example, were obtained by coreacting dianhydrides and diamines to produce a polyamide-acid, i.e., amic-acid, by chain extension. Fibrous materials impregnated with these polyamide-acids were required to be hermetically sealed and refrigerated if they were not to be cured within a reasonable time because of their instability at room temperatures. Moreover, when the polyamide-acid impregnated materials were subsequently cured at elevated temperatures, there was a substantial amount of volatile material given off due not only to the evaporation of solvent, but also to the imidization of the polyamide-acid to the corresponding polyimide. Thus it became necessary, in curing the polyamide-acid impregnated materials to provide special processes whereby an appreciable amount of the volatiles, e.g., water and solvent, were allowed to escape in order to eliminate the interstitial voids which otherwise would appear in the product.

In comparison, it has been found in accordance with this invention, that reinforced polyimide laminates of low-void content and high-thermal stability may be obtained by utilizing an organic solution or dispersion of a polyamide-acid as the impregnant for the boron filaments followed by removing all or part of the solvent, e.g., up to about 90% by weight, and subsequently pyrolytically converting the polyamide-acid to the corresponding polyimide resin.

Accordingly, it is an object of this invention to provide a process for preparing thermoset polyimide-reinforced laminates or plastic composites characterized as having improved thermal stability and a low-void content.

It is another object of this invention to provide a process for preparing laminates comprising boron filaments with a polyamide-acid capable of being pyrolytically polymerized to the corresponding polyimide resin.

It is still a further object of this invention to provide a process and the products obtained therefrom which comprises impregnating boron filaments with an effective amount of a polyamide-acid capable of being imidized, in situ, to low molecular weight polyimide prepolymers which may be cured by the application of heat to a thermosetting polyimide resin.

It is still a further object of this invention to provide a process and the products obtained therefrom wherein boron filaments are impregnated with an organic solution of a polyamide-acid which is capable of being dried to form an intermediate characterized as having tack and drape.

It is still a further object of this invention to provide reinforced resin laminates of improved thermal stability, long shelf-life, and low-void content which are obtained by impregnating boron filaments with a polyamide-acid capable of being imidized, in situ, to an imide prepolymer which may be pyrolytically converted to a thermosetting polyimide resin. These and other objects of the invention will become apparent from a further and more detailed description as follows:

More specifically, this invention relates to a process and to the products obtained therefrom for preparing thermosetting, polyimide-reinforced boron composites or laminates of improved thermal stability. The process comprises impregnating boron filaments with an organic solution or dispersion containing an effective amount of a polyamide-acid, i.e., the precursor of the imide prepolymer followed by drying at temperatures ranging from about 0°–125° C. to remove a substantial part, e.g., up to about 90% by weight of the organic solvent to obtain an intermediate characterized as having the desirable tack and drape. Alternatively, rather than removing any part of the organic solvent, the polyamide-acid on the filaments may be imidized, in situ, directly to the polyimide prepolymer by subjecting the impregnated laminate to temperatures ranging up to about 200° C. After imidization of the polyamide-acid is substantially complete, the temperature may be raised up to about 350° with pressures ranging up to about 1200 p.s.i. where the polyimide prepolymer is pyrolytically converted to a thermosetting resin. The composites may be characterized as comprising boron filaments drawn together by a low-void content resinous matrix, i.e., polyimide resin, obtained from the precursor or prepolymers of the polyimides.

The process particularly provides for the preparation of a tacky, drapable intermediate boron prepreg which can be easily converted by the application of heat, i.e., pyrolytic polymerization to a thermosetting reinforced plastic composite. More specifically, the polyamide-acids which are used for impregnating the boron filaments are imidized, in situ, to low molecular weight polyimide prepolymers by the application of heat which completes the cyclization reaction and allows the removal of volatiles, e.g., organic solvents and water. The boron filaments containing the polyimide prepolymers are converted to a resinous laminate by subjecting the impregnated filaments to temperatures ranging up to about 350° C. while under pressures ranging from atmospheric to about 1200 p.s.i.

The boron filaments, for example, are impregnated with an organic solution of the polyamide-acid and partially dried at temperatures ranging from about 30° to 125° C. to obtain an intermediate. This intermediate is laid-up on a mold surface and a high-temperature vacuum bag is assembled over the layup while air is evacuated from said vacuum bag until a pressure of about 5 to 15 p.s.i. is obtained. The layup is imidized by heating at a temperature ranging from about 125° C. to 200° C. for about 30 minutes. After imidization of the polyamide-acid is complete, the autoclave atmosphere is pressurized to about 200 p.s.i. while the temperature is increased from about 200° C. to 350° C. whereby the polyimide prepolymer is pyrolytically cured over a period of an hour. The resin reinforced composites are obtained by a curing mechanism which is believed to be unique in that rather than curing the polyamide-acid in a single step, polymerization of the low-molecular weight prepolymers take place with fabrication by the application of heat, i.e., pyrolytic polymerization, without the evolution of a large amount of volatile materials which normally accompany imidization reactions.

The polyamide-acids or the precursors of the polyimide prepolymers, which are pyrolytically converted to resins, are prepared by coreacting at least one polyfunctional amine, e.g., an aromatic diamine, with a mixture of anhydrides consisting essentially of at least one polyfunctional anhydride and a specific monoanhydride in approximately stoichiometric proportions under conditions known in the art for preparing polyimides. The reactants are utilized in approximately stoichiometric proportions wherein the equivalence of the amines are calculated to be substantially equal to the equivalence of the anhydrides in the mixture. However, an excess, e.g., up to about 5% by weight of the amines or the anhydrides may be used beyond the stoichiometric calculations and still obtain a satisfactory product. More specifically, at least one polyfunctional amine, e.g., an aromatic diamine, is reacted with the anhydride mixture which consists essentially of the polyfunctional anhydrides and a monoanhydride wherein said monoanhydride is present in the mixture in an amount ranging from about 5.0 to 60 and more preferably 5 to 40 mol percent.

The monoanhydrides may be characterized as an endcapping group for the imide prepolymers and may be characterized by the formula:

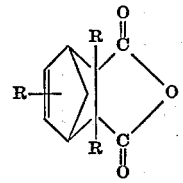

wherein R is selected from the group consisting of hydrogen and lower alkyl radicals having 1 to 5 carbon atoms, i.e., methyl, ethyl, propyl, butyl or amyl radicals and combinations thereof. The prepolymers obtained from the polyamide-acids are characterized as chain-extended polyimides of comparatively low molecular weight, i.e., having an average molecular weight ranging from about 500 to 6,000 which contain an aliphatic and/or aromatic backbone with a specific anhydride as the terminal group, e.g., 3,6-endomethylene-1,2,3,6-tetrahydrophthalic anhydride. These particular anhydrides are stable at room and moderate temperatures but are capable of becoming chemically reactive with the application of heat to form a cured polyimide resin. While it is not completely understood, it is believed that the prepolymers having a particular monoanhydride, e.g., 3,6-endomethylene-1,2,3,6-tetrahydrophthalic anhydride in the molecular terminal position when heated to temperatures of about 200° C. and above become reactive and pyrolytically polymerized to provide di- and ter-polymer molecular linkages producing 3-dimensional macromolecules of higher molecular weights, i.e., polymers having an average molecular weight of at least 10,000. These higher-molecular weight polyimides may be obtained, in situ, from the polyamide-acids in accordance with the reactions illustrated wherein the arrows denote isomerism where in any recurring unit the groups to which arrows point may exist as shown or in interchanged positions, $n$ has a value ranging from 1 to 20 and preferably from 1 to 15, R is selected from the group consisting of hydrogen and lower alkyl radicals of 1 to 5 carbon atoms; $R_1$ is selected from the group consisting of an aryl radical, an alkyl radical, a cycloalkyl radical, an aralkyl radical, an alkaryl radical, an alkylene radical, an arylene radical, a substituted aryl radical, a substituted alkyl radical, a heterocyclic aryl radical, and a substituted aralkyl radical of a polyfunctional amine; $R_2$ may be either the same or different from $R_1$ and is selected from the group consisting of an aryl radical, an alkyl radical, a cycloalkyl radical, an aralkyl radical, an alkaryl radical, an alkylene radical, an arylene radical, a substituted aryl radical, a substituted alkyl radical, a heterocyclic aryl radical and a substituted aralkyl radical of a polyfunctional anhydride.

to substantially reduce the processing time while not appreciably affecting the properties of the products. It should be noted, however, that the relative proportions of the reactants, within the ranges stated, will vary with respect to their molecular weight and the molecular weight desired of the prepolymers being prepared.

In preparing the prepolymers, various polyfunctional amines, including the diamines, triamines and tetramines may be used either alone or in combination in any relative proportion, e.g., 0 to 100% by weight. However, the preferred polyfunctional amines include the diamines, e.g., aromatic diamines containing at least one benzene ring and preferably two benzene rings. In addition to the aromatic amines, the aliphatic amines may be used, and preferably include the aliphatic amines having 5 to 22 carbon atoms per molecule. An example of the amines which may be used for purposes of this invention are illustrated below:

2,5-dimethylhexamethylene diamine;
2,5-dimethylheptamethylene diamine;
5-methyl-nonamethylene diamine;
2,17-diamino-eicosadecane;
1,4-diamino-cyclohexane;
1,10-diamino-1,10-dimethyl decane;
1,12-diamino-octadecane;
para-phenylene diamine;
meta-phenylene diamine;
4,4'-diamino-diphenyl propane;
4,4'-diaminodiphenyl methane;
benzidine;
4,4'-diamino-diphenyl sulfide;

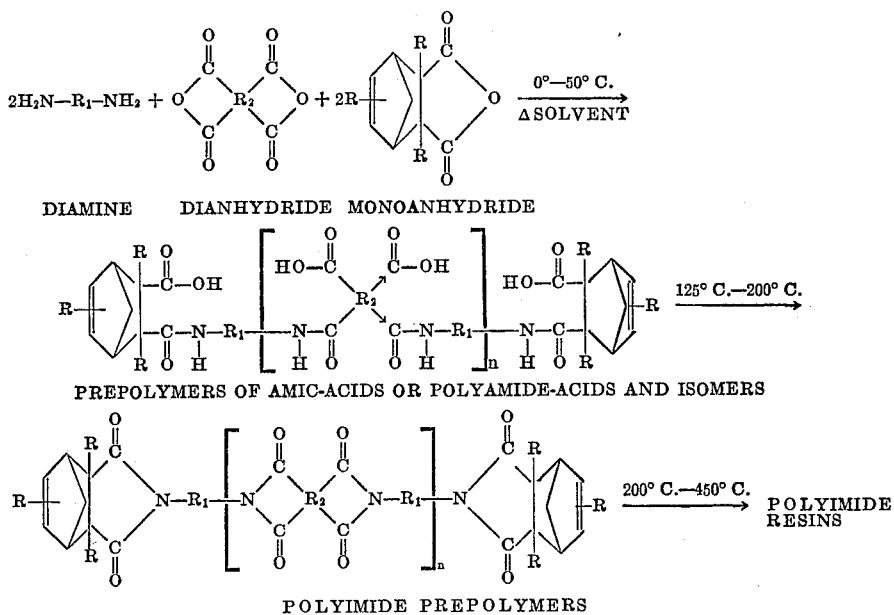

DIAMINE    DIANHYDRIDE   MONOANHYDRIDE

PREPOLYMERS OF AMIC-ACIDS OR POLYAMIDE-ACIDS AND ISOMERS

POLYIMIDE PREPOLYMERS

In preparing the polyamide-acids for purposes of this invention, the polyfunctional amines, e.g., an aromatic amine containing at least one benzene ring; polyfunctional anhydrides, e.g., an aromatic anhydride containing at least one benzene ring, and the monoanhydrides may be coreacted in any order in the presence of one or more organic solvents. Preferably, however, prepolymers are obtained by first reacting the polyfunctional amine with the monoanhydride and then with the polyfunctional anhydride in a solvent such as dimethyl formamide, etc. While it is not necessary, it is preferred to react the polyfunctional amine with the monoanhydride and the polyfunctional anhydride in this particular order. As an alternative, the reactants may be thoroughly mixed as dry powders and then subsequently added to a solvent, e.g., dimethyl formamide. It has been found that by utilizing thoroughly mixed powders of the reactants, it is possible 4,4'-diamino-diphenyl sulfone;
3,3'-diamino-diphenyl sulfone;
4,4'-diamino-diphenyl ether;
1,5-diamino-naphthalene;
3,3'-dimethoxy benzidine;
2,4-bis-(beta-amino-t-butyl)toluene;
bis-(para-beta-amino-t-butyl-phenyl)ether;
bis-(para-beta-methyl-delta-amino-pentyl)benzene;
bis-(para-(1,1-dimethyl-5-aminopentyl)benzene;
1-isopropyl-2,4-metaphenylene diamine;
m-xylene diamine;
hexamethylene diamine;
heptamethylene diamine;
octoamethylene diamine;
nonamethylene diamine;
decamethylene diamine;
diamino-propyl tetramethylene diamine;

3-methylheptamethylene diamine;
4,4'-dimethylheptamethylene diamine;
2,11-diaminododecane;
1,2-bis-(3-amino-propoxy)-ethane;
2,2-dimethyl propylene diamine;
3-methoxy-hexamethylene diamine;
3,3'-dimethyl benzidine;

and the triamines such as 1,3,5-triaminobenzene;
2,4,6-triamino-s-triazine;
1,2,3-triaminopropane;
4,4'4''-triaminotriphenyl methane;
4,4'4''-triaminotriphenylcarbinol; etc.

The polyfunctional anhydrides which may be employed in preparing the prepolymers are preferably the dianhydrides, although the tri- and tetra-anhydrides may be used. The polyfunctional anhydrides which are particularly preferred, however, include the aromatic dianhydrides containing at least one benzene ring. The following are examples of a number of anhydrides which may be used either alone or in combination in any proportion, e.g., 0 to 100% by weight for purposes of this invention, as illustrated below:

pyromellitic dianhydride;
benzophenone tetracarboxylic dianhydride;
2,3,6,7-naphthalene tetracarboxylic dianhydride;
3,3',4,4'-diphenyl tetracarboxylic dianhydride;
1,2,5,6-naphthalene tetracarboxylic dianhydride;
2,2',3,3'-diphenyl tetracarboxylic dianhydride;
2,2-bis(3,4-dicarboxyphenyl)propane dianhydride;
3,4,9,10-perylene tetracarboxylic dianhydride;
bis(3,4-dicarboxyphenyl)ether dianhydride;
ethylene tetracaroxylic dianhydride;
naphthalene-1,2,4,5-tetracarboxylic dianhydride;
naphthalene-1,4,5,8-tetracarboxylic dianhydride;
decahydronaphthalene-1,4,5,8-tetracarboxylic dianhydride;
4,8-dimethyl-1,2,3,5,6,7-hexahydronaphthalene-1,2,5,6-tetracarboxylic dianhydride;
2,6-dichloronaphthalene-1,4,5,8-tetracarboxylic dianhydride;
2,7-dichloronaphthalene-1,4,5,8-tetracarboxylic dianhydride;
2,3,6,7-tetrachloronaphthalene-1,4,5,8-tetracarboxyilc dianhydride;
phenanthrene-1,8,9,10-tetracarboxylic dianhydride;
cyclopentane-1,2,3,4-tetracarboxylic dianhyride;
pyrrolidine-2,3,4,5-tetracarboxylic dianhydride;
pyrazine-2,3,5,6-tetracarboxylic dianhydride;
2,2-bis(2,3-dicarboxyphenyl)propane dianhydride;
1,1-bis(2,3-dicarboxyphenyl)ethane dianhydride;
1,1-bis(3,4-dicarboxyphenyl)ethane dianhydride;
bis(2,3-dicarboxyphenyl) methane dianhydride;
bis(3,4-dicarboxyphenyl) methane dianhydride;
bis(3,4-dicarboxyphenyl)sulfone dianhydride;
benzene-1,2,3,4-tetracaroxylic dianhydride;
1,2,3,4-butane tetracarboxylic dianhydride;
thiophene-2,3,4,5-tetracarboxylic dianhydride, etc.

In preparing the solution or dispersion of the polyamide-acids, various organic solvents may be utilized and include those organic liquids whose functional groups do not react with the prepolymers. Normally, organic solvents comprising the N,N-dialkylcarboxyl amides are useful. The preferred solvents, however, are the lower molecular weight materials including N,N-dimethyl formamide, N,N-dimethyl acetamide, N,N-diethyl formamide, N,N-diethyl acetamide and N,N-dimethylmethoxy-acetamide, etc. In addition, solvents which may be used include the dimethylsulfoxides, N-methyl-2-pyrrolidone, pyridine, formamide, N-methyl-formamide, butyrolactone, etc. These solvents may be used either alone or in combination with other organic liquids, including, for example, benzene, dioxane, butyrolactone, toluene, xylene, cyclohexane, and various mixtures thereof in any proportion.

The following illustrate the reactants which may be used in preparing the polyamide-acids for purposes of this invention.

EXAMPLE I

Approximately 40.7 parts by weight of 4,4'-methylene dianiline, 32.8 parts by weight of 3,6-endomethylene-1,2,3,6-tetrahydrophthalic anhydride and 33.9 parts by weight of 3,3',4,4'-benzophenone tetracarboxylic acid dianhydride were dissolved in 170 parts by weight of dimethylformamide.

EXAMPLE II

A solution was prepared by mixing approximately 1,000 parts by weight of dimethylformamide and 100 parts by weight of toluene to which was added 122.7 parts by weight of 4,4-oxydianiline. The solution was stirred until all of the diamine was in solution and 98.4 parts by weight of 3,6 - endomethylene - 1,2,3,6-tetrahydrophthalic anhydride and 100.8 parts by weight of 3,3',4,4'-benzophenone tetracarboxylic acid dianhydride were added slowly, with stirring, until a solution was obtained.

EXAMPLE III

Approximately 87.0 parts by weight of 4,4'-oxydianiline were dissolved in a solvent mixture of 700 parts by weight of dimethylformamide and 700 parts by weight of toluene. To this solution was added 65.6 parts by weight of 3,6-endomethylene - 1,2,3,6-tetrahydrophthalic anhydride and 63.0 parts by weight of 1,4,5,8-naphthalene tetracarboxylic dianhydride.

EXAMPLE IV

Two solutions were prepared (1) consisting of approximately 57.43 parts by weight of 4,4'-methylene dianiline with 75.0 parts by weight of dimethylformamide and (2) 35.58 parts by weight of 3,6-endomethylene-1,2,3,6-tetrahydrophthalic anhydride with 40.0 parts by weight of dimethylformamide. A third mixture was prepared consisting of approximately 58.36 parts by weight of 3,3',4,4'-benzophenone tetracarboxylic dianhydride with 43.5 parts by weight of dimethylformamide. These preparations were blended together and reacted to provide a polyamide-acid solution.

The above polyamide-acids were used for impregnating the boron filaments by a method which comprises, for example, impregnating the filaments with the polyamide-acids prior to imidization and then subsequently imidizing the precursors on the filaments to form a stable polyimide prepolymer. The prepolymer-impregnated filaments were subsequently heated to temperatures ranging from about 200° to 350° C. for about an hour or more with laminating pressures ranging from about 200 to 600 p.s.i. More specifically, low-void laminates, e.g., less than 2% were prepared by utilizing cure cycles of about 350° C. for a period of about 60 minutes at a pressure of about 200 p.s.i. For thicker laminates, however, an additional cure time of about 30 minutes may be provided for each inch of thickness, e.g., 3/16 to 1-inch thick laminates may be cured in approximately 90 minutes.

In impregnating the boron filaments, up to about 85%, e.g., 20–60% by weight, of said filaments may be impregnated with the polyamide-acids. Organic solutions or dispersions used as the impregnant may contain from about 20 to 85% by weight and preferably, 20 to 60% by weight of the polyamide-acids. The following is an illustration of the method used to prepare the laminates of this invention.

EXAMPLE V

Boron filament prepregs were prepared by utilizing a Mylar film (terephthalic acid polyester) which was fitted tightly to the circumference of a drum and secured at the overlap with tape. A solution of polyamide-acid containing approximately 40% of the precursor in dimethyl formamide was applied to the Mylar surface followed by the addition of a piece of scrim cloth which was laid onto the film. While the drum was slowly rotated, the impregnated scrim cloth was dried by using an industrial hot-air gun until the resin was sufficiently dry to avoid any sagging. An additional coat of the polyamide-acid solution was applied to the impregnated scrim cloth surface and pre-dried in the same manner. The boron filaments were fed to one end of the drum and secured with a small piece of tape. Maximum flexural strength and modulus were obtained by using 208 filaments per longitudinal-inch of drum. The prewound boron filaments were then coated by applying the polyamide-acid solution and again drying in the same manner indicated hereinabove. The prepreg was subsequently removed from the drum and dried in an oven at a temperature of about 82° C. for about 30 minutes and the Mylar film was then removed. The prepreg was cut into rectangular pieces and staged in two steps by (1) placing them in an air-circulating oven at 177° C. for about five minutes, (2) cooling them between flat metal plates and then repeating this process at an oven temperature of about 246° C. The thickness of the finished prepreg was approximately 0.006 to 0.007 of an inch. The finished prepreg was found to be stable in air and had no particular storage or handling problems. Laminates were prepared from 10 layers of the polyamide-acid, boron prepregs by molding the prepregs in a press at about 315° C. After inserting the stacked plies into the heated press, they were subjected to a contact pressure for 90 seconds and then the full molding pressure of 100 p.s.i. for about a 60-minute cycle.

As alternatives to the above process, it is possible to utilize the steps described up to the point of removing the tape from the drum. At this point, the tape is dried partially, e.g., up to about 90% by weight of the solvent may be removed to obtain an intermediate prepreg characterized as having tack and drape. These intermediates may have up to about 10% by weight of the solvent remaining in the prepreg. However, it is obvious that all of the solvent may be removed, e.g., 0 to 100%, from the prepreg prior to removing the tape from the drum. It should be noted that the tacky prepregs have an advantage over the completely or substantially dried prepregs in preparing contour parts because it facilitates the layup of unusual shapes by minimizing ply slippage. In order to prepare void-free articles by this process, it is necessary in the fabrications step to imidize the polyamide-acid, in situ, after layup in stacked plies at about 246° C. at atmospheric pressure prior to raising the temperature to 315° C. and applying 100 p.s.i. mechanical pressure. This imidization at low temperature is needed to permit the escape of the volatile condensation products prior to initiating resin flow.

As another alternative, the control of the resin content may be maintained by preparing a prepreg of thin-light-weight glass scrim cloth having as much as 80% resin. The resin is applied to the scrim cloth in the form of a polyamide-acid precursor in an organic solvent. The high-resin content prepreg is subsequently laid onto the winding drum and the boron filament is wound into the prepreg. The resultant boron-impregnated prepreg is removed from the drum, imidized and molded in a manner similar to that described above. As a further alternative, it is obvious that it is possible to perform the imidization step concurrently with the molding process. Further, it is possible as an alternative to wind the boron filaments onto the drum first without the addition of the polyamide-acid solution and then subsequently applying the polyamide-acid prepreg on top of the prewound boron.

The cured panels were machined into flexural strength and flexural modulus specimens 4″ long by 0.5″ wide. The thickness of these specimens were in the range of 0.06 to 0.07 of an inch. A number of these test specimens were selected for thermal aging at 288° C. for periods of 200, 500 and 1,000 hours. The boron volumetric fiber content was determined by standard optical means. The resin void content was calculated by using Equation 1.

$$\text{Void content, percent} = 100\left(1 - \frac{d_m}{d_c}\right)$$

where $d_m$ = measured density of the composite, g./ml.
$d_c$ = calculated density of the composite, g./ml.
$d_c$ is obtained assuming additive volumes $$\frac{1}{d_c} = \frac{f_b}{d_b} + \frac{f_g}{d_g} + \frac{f_r}{d_r}$$

where $d_b$ = density of boron-tungsten monofilaments, 2.635 g./ml.
$dg$ = density of the glass scrim cloth, 2.54 g./ml.
$d_r$ = density of the cured polyimide resin, 1.392 g./ml.
$f$ represents the weight fraction of the composite component denoted by the subscript, $b$ for boron, $g$ for glass and $r$ for resin.

The results of the mechanical property testing of the boron-reinforced polyamide-acid laminates are set forth in Table 1. The average boron content of the laminates was calculated to be about 37% v./v. The average void content was determined to be less than 1% v./v.

TABLE I.—BORON REINFORCED POLYIMIDE COMPOSITES

| Test[a] temperature, °F. | Time aged[b] at 288° C., hrs. | Number of tests | Flexural strength,[c] 10³ p.s.i. | | Flexural modulus, 10⁶ p.s.i. | | Interlaminar shear strength,[c] 10³ p.s.i. | |
|---|---|---|---|---|---|---|---|---|
| | | | Avg. | Std. dev. | Avg. | Std. dev. | Avg. | Std. dev. |
| 75 | 0 | 5 | 222.7 | 14.2 | 24.3 | 2.5 | [d] 9.87 | 0.63 |
| 550 | 0 | 2 | 178.7 | 38.0 | 20.0 | 2.7 | 5.26 | 0.29 |
| 550 | 200 | 6 | 143.0 | 13.5 | 18.8 | 2.3 | 5.81 | 0.65 |
| 550 | 500 | 6 | 140.6 | 12.8 | 20.5 | 2.3 | 5.43 | 0.61 |
| 550 | 1,000 | 5 | 148.7 | 16.6 | 21.0 | 1.0 | 3.98 | 0.54 |

[a] All coupons were soaked 30 minutes at elevated test temperature prior to test to insure thermal equilibrium.
[b] All thermal aging was performed in air circulating ovens.
[c] Tested in accordance with General Dynamics Corporation "Advanced Composite Materials Test Specification FPS-2003," dated 21 April, 1967.
[d] Average of triplicate results performed on test panels.

It should be noted from the data that the over-all results showed excellent mechanical properties. The small effect of temperature and of long aging at high temperatures on the mechanical properties point out the potentiality of the boron-filament composites for use as structural members, particularly in air-breathing engines, etc.

The polyamide-acid precursors of this invention, which are easily converted to the polyimide resins, exhibited good adhesion to the boron filaments, improved thermal stability, relative ease of processing, a long shelf life, and a low-void content of the final product. The utilization of high-performance plastic composites as set forth in this invention offers an attractive means for reducing the weight of engine components, for example, such as blades, vanes, discs, seals, casings, etc., without sacrificing power capability. The mechanical properties of fiber-reinforced plastics rival those of metal and therefore it may be possible to substitute these composites for the metal used heretofore.

While this invention has been described with respect to a number of specific embodiments, it is obvious that there are other variations and modifications which can be made without departing from the spirit and scope of the invention as particularly pointed out in the appended claims.

What is claimed is:

1. A process for preparing a boron-reinforced polyimide laminate of improved thermal stability and low-void content which comprises (1) impregnating boron filaments with an effective amount of an organic solution containing a polyamide-acid; (2) removing from 0 to 100% by weight of the solvent from the impregnated filaments and (3) subsequently curing the polyamide-acid by subjecting said impregnated filaments to temperatures ranging from about 125° C. to 350° C. at pressures ranging up to about 1200 p.s.i. until a polyimide-reinforced laminate is obtained; wherein said polyimide resin has an average molecular weight of at least 10,000 and said polyamide-acid is prepared by coreacting approximately stoichiometric amounts of at least one polyfunctional amine, with a mixture of anhydrides consisting essentially of at least one polyfunctional anhydride and a monoanhydride having the formula:

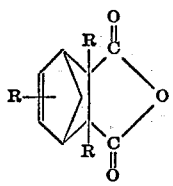

wherein R is selected from the group consisting of hydrogen and lower alkyl radicals having 1 to 5 carbon atoms.

2. The process of claim 1 further characterized in that substantially all of the organic solvent is removed from the impregnated filaments prior to curing.

3. The process of claim 1 further characterized in that prior to curing the polyamide-acid-impregnated filaments, up to about 90% of the organic solvent is removed to obtain an intermediate characterized as having tack and drape.

4. The process of claim 1 further characterized in that the polyamide-acid is present in the organic solution in an amount ranging from about 20 to 60% by weight of the solvent.

5. The process of claim 1 further characterized in that the boron filaments are impregnated with up to about 85% by weight with said polyamide-acid.

6. The process of claim 1 further characterized in that the polyamide-acid is cured at a temperature ranging from about 200° to 300° C. at a pressure ranging from about 100 to 600 p.s.i.

7. The process of claim 1 further characterized in that the solvent comprises dimethyl formamide.

8. The process of claim 1 further characterized in that the polyamide-acid has an average molecular weight ranging from about 500 to 6000.

9. The process of claim 8 further characterized in that the polyamide-acid has an average molecular weight ranging from about 500 to about 3000.

10. The process of claim 1 further characterized in that the polyfunctional amine comprises at least one aromatic diamine and the polyfunctional anhydride comprises at least one aromatic dianhydride.

11. The process of claim 10 further characterized in that the aromatic diamine contains at least one benzene ring.

12. The process of claim 10 further characterized in that the aromatic dianhydride contains at least one benzene ring.

13. The process of claim 1 further characterized wherein the monoanhydride is characterized by the formula wherein R is a hydrogen atom.

14. The process of claim 1 further characterized in that the monoanhydride is characterized by the formula wherein at least one R is an alkyl radical.

15. A process of preparing a boron-reinforced polyimide laminate of improved thermal stability and low-void content which comprises (1) impregnating boron filaments with up to about 85% by weight of said filaments with an organic solution containing 20 to 85% by weight of a polyamide-acid; (2) removing from 0 to 100% by weight of the solvent from the impregnated filaments and (3) subsequently curing the polyamide-acid by subjecting said impregnated filaments to temperatures ranging from about 200° C. to 350° C. at pressures ranging from about 50 to 1200 p.s.i. until the reinforced polyimide laminate is obtained; wherein said polyimide resin has an average molecular weight of at least 10,000 and said polyamide-acid solution is prepared by coreacting in an organic solvent approximately stoichiometric amounts of at least one polyfunctional amine with a mixture of anhydrides consisting essentially of at least one polyfunctional anhydride and a monoanhydride wherein said monoanhydride is present in said mixture in an amount ranging from about 5 to 60 mol percent; said monoanhydride having the formula:

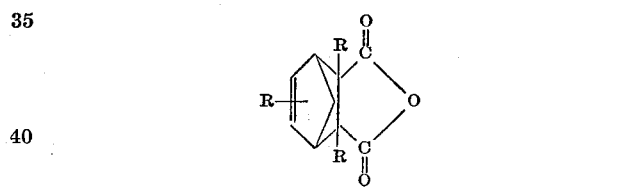

wherein R is selected from the group consisting of hydrogen and lower alkyl radicals having 1 to 5 carbon atoms.

16. The process of claim 15 further characterized in that up to about 85% by weight of said filaments are impregnated with an organic solution containing 20 to 60% by weight of the polyamide-acids.

17. The process of claim 15 further characterized in that up to about 90% by weight of the solvent is removed from the impregnated filaments prior to curing the polyamide-acid.

18. The process of claim 15 further characterized in that the polyamide-acid is cured on the boron filaments by subjecting said impregnated filaments to temperatures ranging from about 200° to 300° C. at pressures ranging from about 200 to 800 p.s.i.

19. The process of claim 15 further characterized in that the monoanhydride is characterized by the formula wherein R is a hydrogen atom.

20. A boron-reinforced polyimide laminate comprising: (A) boron filaments impregnated with an effective amount of (B) a polyimide, wherein said polyimide has an average molecular weight of at least 10,000 and is prepared by coreacting approximately stoichiometric amounts of at least one polyfunctional amine with a mixture of anhydrides consisting essentially of at least one polyfunctional anhydride and a monoanhydride wherein said monoanhydride is present in said mixture in an amount ranging from about 5 to 60 mol percent; said monoanhydride having the formula:
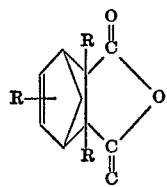
wherein R is selected from the group consisting of hydrogen and lower alkyl radicals having 1 to 5 carbon atoms.
References Cited
UNITED STATES PATENTS
3,565,549  2/1971  Lubowitz et al. ___ 117—126 GB
OTHER REFERENCES
Whitney et al.: Chem. Abstracts, vol. 65, 13872 c (1966).
WILLIAM D. MARTIN, Primary Examiner
D. COHEN, Assistant Examiner
U.S. Cl. X.R.
117—121, 128.4, 161 P; 161—214; 156—308

UNITED STATES PATENT OFFICE
CERTIFICATE OF CORRECTION

Patent No. 3,697,308        Dated October 10, 1972

Inventor(s) Hyman R. Lubowitz and Robert W. Vaughan

It is certified that error appears in the above-identified patent and that said Letters Patent are hereby corrected as shown below:

Column 5, Diag. 3     should read -- 200°C.-350°C $\xrightarrow{\phantom{aaaaaa}}$ Polyimide Resins --

Column 7, line 12     should read -- 2,46-triamino-$\underline{s}$-triazine --

Column 10, line 32    "dg" should read -- $d_g$ --

Column 10, line 2 of Table I.    "Test$^a$ Conditions" should read -- Test Conditions --.

Signed and sealed this 29th day of April 1975.

(SEAL)
Attest:

RUTH C. MASON
Attesting Officer

C. MARSHALL DANN
Commissioner of Patents
and Trademarks